United States Patent
Sundar Meganathan et al.

(10) Patent No.: US 10,602,306 B1
(45) Date of Patent: Mar. 24, 2020

(54) ORGANIZATIONAL CONTEXT-BASED OPERATIONS OF A MOBILE DEVICE

(71) Applicant: Honeywell International Inc., Morris Plains, NJ (US)

(72) Inventors: Deepak Sundar Meganathan, Bangalore (IN); Sakthi Vinayagan K, Bangalore (IN); Roshan Lawrence Valder, Bangalore (IN); Murugan Gopalan, Bangalore (IN); Sanjay Roy, Plymouth, MN (US); Himanshu Khurana, Plymouth, MN (US); Manu Taranath, Bangalore (IN); Ananth Sozhan, Bangalore (IN); Raghavendra Prasad Balapala, Nandikotkur (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/140,184

(22) Filed: Sep. 24, 2018

(51) Int. Cl.
| | |
|---|---|
| *H04W 4/00* | (2018.01) |
| *H04W 4/021* | (2018.01) |
| *H04W 4/33* | (2018.01) |
| *H04W 8/00* | (2009.01) |
| *H04W 68/00* | (2009.01) |
| *H04W 48/16* | (2009.01) |
| *H04W 4/80* | (2018.01) |

(52) U.S. Cl.
CPC .......... *H04W 4/021* (2013.01); *H04W 4/33* (2018.02); *H04W 4/80* (2018.02); *H04W 8/005* (2013.01); *H04W 48/16* (2013.01); *H04W 68/00* (2013.01)

(58) Field of Classification Search
CPC ....... H04W 4/021; H04W 4/80; H04W 8/005; H04W 48/16; H04W 68/00
See application file for complete search history.

(56) References Cited

U.S. PATENT DOCUMENTS

| | | | |
|---|---|---|---|
| 7,627,334 B2 | 12/2009 | Cohen et al. | |
| 9,980,076 B1 * | 5/2018 | Pratt | ....................... H04S 7/303 |
| 2007/0264974 A1 * | 11/2007 | Frank | ................... H04L 63/0407 455/411 |
| 2009/0094533 A1 * | 4/2009 | Bozionek | .............. H04L 65/403 715/753 |
| 2012/0095979 A1 | 4/2012 | Aftab et al. | |

(Continued)

OTHER PUBLICATIONS

Aziz, et al., "Context Aware Information Delivery for On-Site Construction Operations", Centre for Innovative & Collaborative Engineering, Department of Civil and Building Engineering, Loughborough University, Leicester, UK, Oct. 9, 2015, 7 pages.

(Continued)

*Primary Examiner* — Charles T Shedrick
(74) *Attorney, Agent, or Firm* — Brooks, Cameron & Huebsch, PLLC

(57) ABSTRACT

Systems, devices, and methods for organizational context-based operations of a mobile device are described herein. One device includes instructions stored thereon executable by a processor to determine location information corresponding to a mobile device in a facility associated with an organization, determine a particular area of the facility in which the mobile device is located based on the location information, determine an organizational context while the device is in the particular area, and cause a change of an operation of the mobile device based on the context.

18 Claims, 2 Drawing Sheets

(56) References Cited

U.S. PATENT DOCUMENTS

| | | | |
|---|---|---|---|
| 2013/0214902 A1* | 8/2013 | Pineau | H04W 4/90 340/5.61 |
| 2014/0359499 A1 | 12/2014 | Cho et al. | |
| 2015/0106737 A1 | 4/2015 | Montoy-Wilson et al. | |
| 2016/0088438 A1* | 3/2016 | O'Keeffe | H04W 4/21 455/456.2 |
| 2016/0110984 A1* | 4/2016 | Seol | G08B 21/02 340/539.13 |
| 2016/0147211 A1* | 5/2016 | Kore | G05B 19/0426 700/83 |
| 2016/0335819 A1* | 11/2016 | Lingan | H04W 4/021 |
| 2017/0325062 A1* | 11/2017 | Irani | H04W 4/021 |
| 2017/0325067 A1 | 11/2017 | Greenberger | |
| 2018/0146342 A1* | 5/2018 | Jones | H04W 4/029 |
| 2018/0249014 A1 | 8/2018 | Karlsson et al. | |

OTHER PUBLICATIONS

Huang, "Context-aware Collaborative Filtering in Location Based Services", Vienna University of Technology, https://pdfs.semanticscholar.org/c716/0e380a2790eb4f73daf594e433180b4af702.pdf, 2010, 29 pages.

Extended Search Report from related European Application No. 19199071, dated Nov. 26, 2019, 7 pages.

* cited by examiner

ORGANIZATIONAL CONTEXT-BASED OPERATIONS OF A MOBILE DEVICE

TECHNICAL FIELD

The present disclosure relates to systems, devices, and methods for organizational context-based operations of a mobile device.

BACKGROUND

An organization may desire to improve the experiences of people in a facility (e.g., building) under the organization's control. In some instances, this may include providing useful information. In some instances, this may include fostering an environment of respect and/or free of distraction.

Some previous approaches may provide information via notice boards which have the notable shortcoming of having fixed locations and may thus not be seen by those who do not pass by or take notice. Some previous approaches may provide information electronically (e.g., via email, messaging systems, and/or social networking methods. In such approaches, information may be sent to people's fixed (e.g., desktop) computing devices and/or mobile devices.

However, these types of notices can be missed as they may be buried under previously sent communications. Additionally, previous facility messaging systems may lack the ability to schedule information based on contexts of time and/or location, rendering people inundated with an overabundance of unhelpful information. Furthermore, these systems may not make information persistent and/or available to people based on the organization's needs and may not allow for connecting pieces of disparate information, such as websites and/or multimedia, into one point of access.

DETAILED DESCRIPTION

Figure 1:
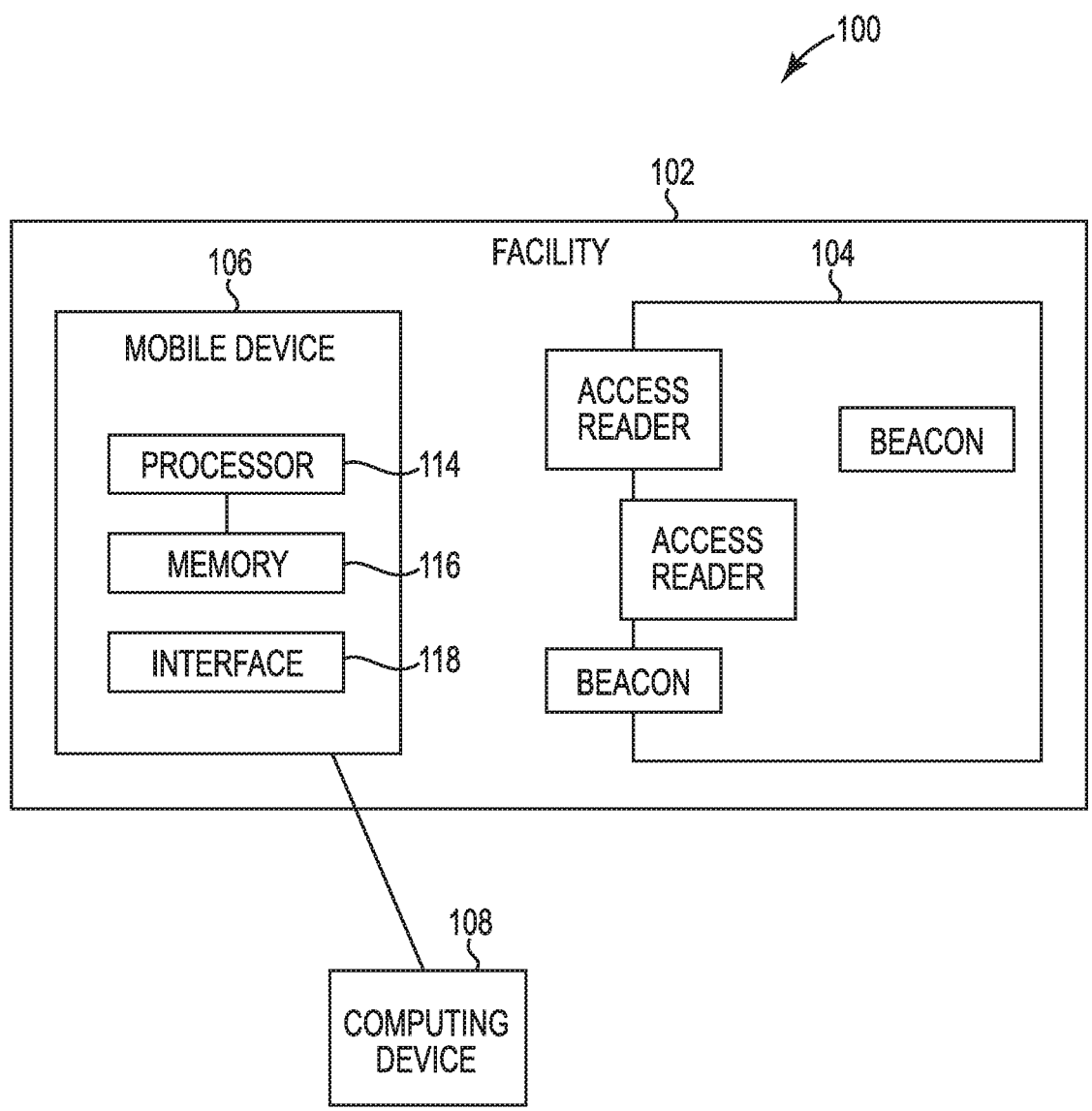
FIG. 1 illustrates a system for organizational context-based operations of a mobile device in accordance with one or more embodiments of the present disclosure.

Organizational context-based control of a mobile device is described herein. For example, one or more embodiments include a computer-readable medium having instructions stored thereon executable by a processor to determine location information corresponding to a mobile device in a facility associated with an organization, determine a particular area of the facility in which the mobile device is located based on the location information, determine an organizational context while the device is in the particular area, and cause a change of an operation of the mobile device based on the context.

Embodiments of the present disclosure can utilize the ubiquity and utility of mobile devices to provide information to people and foster an environment free of distraction. By using a mobile device—something most users typically already carry—embodiments of the present disclosure can provide useful, contextual information based on a person's location in a facility, the time context (e.g., time of day, day of week, etc.), and/or their membership in an organizational group (e.g., a division, a workgroup, a managerial level, etc.).

Embodiments of the present disclosure can allow organizations to send persistent information to people via their mobile devices based on the location of the mobile device in a facility, the time, and the group(s) to which they belong. Determining the location of a person can enable the communication of information to be filtered and contextual. In some embodiments, for instance, the information may pertain specifically to that location. In contrast with previous approaches, an organization can provide context-specific information at an appropriate time and place. Thus, the information provided can be meaningfully improved over previous approaches by not being buried under previously sent communications. Additionally, embodiments herein can avoid the problems of previous approaches associated with inundating people with an overabundance of unhelpful information. Furthermore, embodiments herein can connect pieces of disparate information, such as websites and/or multimedia, into one point of access.

Accordingly, a user can look at the display of her mobile device and instantly visualize information specifically tailored to her based on her location, her membership and/or position within the organization, and/or the time. Such display represents a marked improvement in the ability for a user to process relevant, useful information using the relatively small display size of a mobile device. When display space is at a premium, embodiments of the present disclosure improve the functioning of the display by tailoring the information displayed thereon to specific context(s).

In an example, a user who enters a conference room may be provided with information regarding how to establish a conference call using the room's conference phone. In another example, if an emergency is occurring on the third floor of a building, users currently located on the third floor may be notified with instructions detailing evacuation paths. In another example, users entering a room holding a presentation can be provided with information such as notes, a copy of the presentation, and/or information about the presenter.

In some embodiments, the experiences of people in a facility can be improved by changing the audio profiles of mobile device(s) in a particular location. Previously, for instance, attendees of an event (e.g., a conference, class, meeting, etc.) may be asked to silence their mobile devices. In some cases, this instruction may be forgotten, incorrectly executed, or otherwise not followed. Annoyance and/or embarrassment may result when an audible notification is received in an area where silence is desired. Additionally, important calls may be missed by those who forget to re-activate their ringer upon the conclusion of the event and/or their exit from the event area.

Embodiments of the present disclosure can cause a mobile device to change from a first audio profile to a second audio profile based on the location of the mobile device. In some embodiments, the first audio profile can be a "full volume" profile where notifications are provided above a certain volume level and the second audio profile can be a "silent mode" profile where notifications are provided without any audible aspect or via vibration. Embodiments herein are not limited to two audio profiles and the audio profiles discussed herein can be configured by the organization and/or the individual user. In some embodiments, the change can be configured to occur automatically (e.g., without user input) based on the user's location. In some embodiments, the change can be configured to occur based on the user's location and responsive to an input via an interface of the mobile device. For example, the user may be prompted, via the mobile device, to accept a change to silent mode. The user may respond to the prompt by selecting a display icon, for instance, or by another method, such as a voice command and/or gesture (knock on the mobile device, gesture using the mobile device, etc.).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

FIG. 1 illustrates a system 100 for organizational context-based operations of a mobile device in accordance with one or more embodiments of the present disclosure. As shown in FIG. 1, system 100 includes a facility 102 having an area 104 therein. The facility 102 can include one or more buildings, businesses, homes, plants, hospitals, refineries, etc. The facility (or a portion of the facility including the area 104) can be controlled by an organization. An organization, as used herein, refers to a company, a firm, a corporation, an institution, a consortium, a partnership, and/or another entity that owns and/or utilizes the facility 102. An organization can include people as discussed herein who may possess mobile devices (e.g., the mobile device 104) in accordance with embodiments of the present disclosure.

The area 104 can be a portion of the facility 102. In some embodiments, the area 104 can be a room, a plurality of rooms, a wing, a building, a plurality of buildings, an installation, etc. In some embodiments, the area 104 can be defined by physical boundaries (e.g., walls, doors, etc.). In some embodiments, the area 104 can be defined by logical and/or geographic boundaries. The area 104 can be defined by a user, by a Building Information Model (BIM) associated with the facility 102, and/or by an access control system associated with the facility 102.

The system 100 can include a mobile device 106. The mobile device 106 can be a client device carried or worn by a user. For example, the mobile device 106 can be a phone (e.g., smartphone), personal digital assistant (PDA), tablet, and/or wearable device (e.g., wristband, watch, necklace, etc.). It is to be understood that "mobile device" as referred to herein can include one or more auxiliary devices in communication with a mobile device (e.g., wireless headsets, wearable devices, etc.). The mobile device 106 can include one or more software applications (e.g., apps) which can define and/or control communications between the mobile device 106, a computing device 108, additional mobile devices, one or more beacons of the facility and/or one or more access readers of the facility. Apps may be received by the mobile device 106 from the computing device 108, for instance. Apps may be launched by a user and/or responsive to some other condition (e.g., the interaction between the mobile device 106 and a beacon (discussed below)). In some embodiments, apps can be executing as background apps. Apps may be and/or include a digital identity, discussed further below.

The mobile device 106 can include a location functionality configured to allow a determination of a location of the mobile device 106. In some embodiments, the location functionality includes a GPS and/or Wi-Fi functionality of the mobile device 106, though embodiments of the present disclosure are not so limited. For example, the mobile device 106 can include an imaging functionality (e.g., a camera) which can be used to read a code at a particular (e.g., known) location in the facility 102.

In some embodiments, the system 100 can include one or more beacons. The example illustrated in FIG. 1 includes two beacons, a first beacon 110-1 and a second beacon 110-2 (cumulatively referred to herein as "beacons 110"). Though two beacons are shown, embodiments of the present disclosure are not limited to a particular number of beacons 110. The beacons 110 can devices capable of wireless communication with the mobile device 106. In some embodiments, one or more of the beacons 110 can be associated with (e.g., located proximal to) a door of the area 104. In some embodiments, one or more of the beacons 110 are not associated with a door of the area 104. In some embodiments, the beacons 110 can be dispersed throughout the facility 102 such that a location of the mobile device 106 can be tracked throughout the facility 102. In addition to, or in place of, the location functionality of the mobile device 106, the beacons can allow the determination of a location of the mobile device 106. For example, the beacons 110 can allow the determination of whether the mobile device 106 is within a particular (e.g., threshold) distance of the area 104. In some embodiments, being located within a threshold distance of the area 104 refers to a condition of being located within the area 104. The beacons 110 can communicate with the mobile device 106 via BLUETOOTH® Low Energy (BLE) technology (e.g., as an iBeacon), Wi-Fi, etc. In some embodiments, the beacons 110 can include one or more readable tags (e.g., near field communication (NFC)) tags.

In some embodiments the facility 102 can include one or more access readers. The example illustrated in FIG. 1 includes two access readers, a first access reader 112-1 and a second access reader 112-2 (cumulatively referred to herein as "access readers 112"). Though two access readers 112 are shown, embodiments of the present disclosure are not limited to a particular number of access readers 112. The access readers 112 can devices capable of wireless communication with the mobile device 106. One or more of the access readers 112 can be associated with (e.g., located proximal to) a door of the area 104. In some embodiments, pairs of access readers 112 may be associated with a door to the area 104. For instance, the first access reader 112-1 may be an "in" reader configured to indicate the entry of the mobile device 106 into the area 104 and the second access reader 112-2 may be an "out" reader configured to indicate the exit of the mobile device 106 from the area 104.

The access readers 112 can, in some embodiments, include, or be associated with, a locking device (e.g., for a door). In some examples, the access readers 112 can include one or more actuating mechanisms. The access readers 112 can be associated with one or more controlled functionalities. As used herein "controlled functionality" refers to a functionality under the control of the facility or an organization therein. For instance, an electronic door lock may be controlled by one or more of the access readers 112. In some embodiments, the control may be provided from the mobile device 104. In some embodiments, the control may be provided directly (from the computing device 108 to the access readers 112) or via one or more intermediary devices (e.g., a controller) in communication with the access readers 112.

In some cases, the facility 102 can include both beacons 110 and access readers 112. In some cases, the facility 102 includes beacons 110 but not access readers 112. In some cases, the facility 102 includes access readers 112 but not beacons 110. In some cases, the facility 102 may include neither beacons 110 nor access readers 112. In such cases, the location of the mobile device 106 may be determined using alternative methods such as, for example, GPS, magnetic fingerprinting techniques, etc.

The computing device 108 can be a device or plurality of devices configured to provide control of one or more aspects of the facility 102. Though in the example illustrated in FIG. 1 the computing device 108 is shown external to the facility 102 (e.g., remote with respect to the facility 102), embodiments of the present disclosure are not so limited. In some embodiments, the computing device 108 is internal to the facility 102 (e.g., local with respect to the facility 102). In some embodiments the computing device 108 can control (e.g., manage) access to a number of areas (e.g., the area 104) of the facility 102. In some embodiments, the computing device 108 can be cloud-based. In some embodiments, the computing device 108 can manage access to one or more areas across a plurality of facilities.

The mobile device 106 can communicate with (e.g., exchange data with) the computing device 108 via a wired and/or wireless connection, for instance. In some embodiments, the mobile device 106 can communicate using one or more communications modules (e.g., cellular, Wi-Fi, etc.). Communication between various devices herein can be carried out over a wireless network. A wireless network, as used herein, can include Wi-Fi, BLUETOOTH®, or any other suitable means to wirelessly transmit and/or receive information.

The mobile device 106 can include a memory 116 and a processor 114 configured to execute executable instructions stored in the memory 116 to perform various examples of the present disclosure, for example. That is, the memory 116 can be any type of non-transitory storage medium that can be accessed by the processor 114 to perform various examples of the present disclosure. For example, the memory 116 can be a non-transitory computer readable medium having computer readable instructions (e.g., computer program instructions) stored thereon that are executable by the processor 114.

The memory 116 can be volatile or nonvolatile memory. The memory 116 can also be removable (e.g., portable) memory, or non-removable (e.g., internal) memory. For example, the memory 116 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 116 is illustrated as being located within the mobile device 106, embodiments of the present disclosure are not so limited. For example, memory 116 can also be located internal to another computing resource (e.g., enabling computer readable instructions to be downloaded over the Internet or another wired or wireless connection). In some embodiments, the memory 116 and/or the processor 114 can be located in the computing device 108.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

The mobile device 106 can include an interface 118. In some embodiments, the interface 118 includes a display (e.g., a screen). The display can be, for instance, a touch-screen (e.g., the display can include touch-screen capabilities). The interface 118 can provide (e.g., display and/or present) information to a user of the mobile device 106.

Additionally, the mobile device 106 can receive information from the user of the mobile device 106 through an interaction with the user via the interface 118. For example, the mobile device 106 (e.g., the display of the interface 118) can receive input from the user via the interface 118. The user can enter the input into the mobile device 106 using, for instance, a mouse and/or keyboard associated with the mobile device 106, or by touching the display of the interface 118 in embodiments in which the display includes touch-screen capabilities (e.g., embodiments in which the display is a touch screen). In some embodiments, the interface 118 includes an audio interface such that the mobile device 106 can receive audio commands. In some embodiments, the interface 118 can be configured to detect gesture input(s) made by a user with respect to the mobile device and execute instructions responsive to that input.

Figure 2:
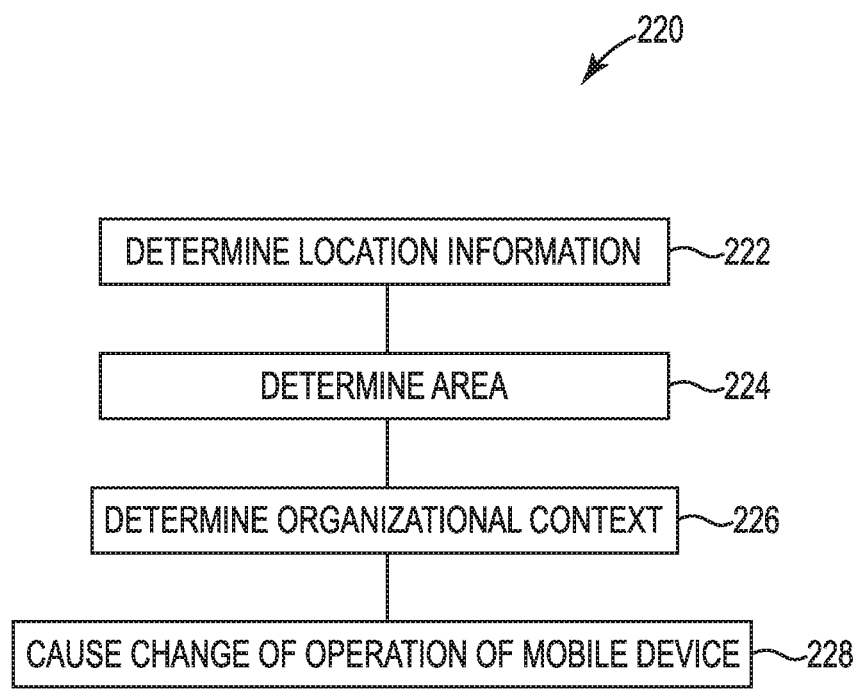
FIG. 2 illustrates a flowchart associated with organizational context-based operations of a mobile device in accordance with one or more embodiments of the present disclosure.

FIG. 2 illustrates a flowchart 220 associated with organizational context-based operations of a mobile device in accordance with one or more embodiments of the present disclosure. In some embodiments, the steps of the flowchart 220 can be executed by a mobile device (e.g., the mobile device 106, previously described in connection with FIG. 1). In some embodiments, the steps of the flowchart 220 can be executed by a computing device (e.g., the computing device 108, previously described in connection with FIG. 1). In some embodiments, a mobile device and a computing device (e.g., a computing device external to the facility) can perform a subset of the steps of the flowchart 220.

At 222, embodiments herein can determine location information corresponding top a mobile device in a facility associated with an organization. Location information can refer to a location of the mobile device. The location can be provided as a particular geographic location (e.g., latitude/longitude) and/or a location with respect to another location, such as an area of a facility or a beacon of a facility. In some embodiments, location information can be communicated from the mobile device, and thus received, responsive to a communication being established between the mobile device and one or more beacons and/or access readers of a facility. In some embodiments, an indication that the mobile device is within a particular distance of an area of a facility can be received.

At 224, embodiments herein can determine a particular area of the facility in which the mobile device is located based on the location information. In some embodiments, location information can include a determination that the mobile device is located within a particular area and/or within a particular distance of an area of a facility. For example, embodiments of the present disclosure can determine that the user has drawn within 5 meters of a particular area of a facility. Being within the particular distance of the area may indicate that the user desires to enter the area. Further, embodiments of the present disclosure can determine a direction of travel of the user and/or a speed of the user. If the user is traveling directly toward the area, embodiments can determine that the user desires to enter the area.

At 226, embodiments herein can determine an organizational context while the device is in the particular area. As described herein, organizational context can include, for instance, a time context and/or a group of the organization to which a user of the mobile device belongs (discussed further below).

At 228, embodiments herein can cause a change of an operation of the mobile device based on the context. In some embodiments, such a change can include causing the mobile device to display information (e.g., information promulgated by the organization). In some embodiments, such a change can include causing a change in an audio profile of the mobile device.

It is to be understood that embodiments herein can cause changes in operations of mobile devices based upon one or more of: location, time context, and group(s) to which a user of the mobile device belongs. With respect to location, embodiments herein can tailor information to users that is relevant based on their current location. For example, information regarding the day's meeting schedule in a particular conference room can be provided to a user who has entered that conference room. Information regarding the procedure for electronically reserving a conference room can be provided to a user who has entered that conference room. Instructions for establishing a conference call in a particular conference room can be provided to a user who has entered that conference room. The day's lunch menu can be provided to a user who has entered a cafeteria. Recent changes in visitor policy can be provided to a user who is in proximity to an organization's front desk. Evacuation instructions can be provided to a user who is on a same floor as a current emergency. In some embodiments, when a user leaves a particular location, the information provided can be removed from their display. Such removal can alleviate problems associated with information overload, for instance. Thus, when the information becomes less relevant to the user based on the user's exit from a particular location, that information may no longer be provided (e.g., until the user returns to the same location).

With respect to time context, embodiments herein can tailor information to users that is relevant based on the time context. Stated differently, time context may govern the information communicated by the organization that is to be displayed by the mobile device. Time context can refer to single time instances and/or to recurring time instances and/or events. For example, if a user in a reserved conference room is nearing the end of their scheduled reservation period, instructions for extending the reservation can be provided. Alternatively, embodiments herein can recommend and/or reserve a different available conference room. If a presentation to which the user was invited is approaching (e.g., less than fifteen minutes away), a copy of the presentation may be provided.

With respect to group(s), embodiments herein can tailor information to users that is relevant based on the organizational group(s) to which users belong. Group, as used herein, can refer to a user's positional rank within an organization, membership of a "team," workgroup, and/or task force within an organization, and/or job description, among others. For example, information regarding a current emergency in a facility may be communicated in first manner (or level of detail) to a first user, who is an executive of the organization, and in a second manner (or level of detail) to a second user, who is a medical professional of the organization. In a common workspace, information regarding a project and/or collaborative goal may be communicated to an executive at a higher level of resolution (e.g., including fewer fine details) than to a junior employee.

Determining a group to which the user belongs can include accessing a digital identity stored on a mobile device of the user. A digital identity can correspond to the physical identity of the user. The digital identity can be unique to the mobile device of the user (e.g., one digital identity per mobile device of the user). The digital identity can be (or be a portion of) an app, for instance (e.g., executable instructions stored on a computer-readable medium).

In some embodiments, the digital identity can be a permanent digital identity. A permanent digital identity can be a digital identity that does not expire. For example, a permanent digital identity can be sent to the mobile device of a user who is an employee that works in the facility. The employee can utilize the permanent digital identity until the employee is no longer employed at the facility.

In some embodiments, the digital identity can be a temporary digital identity. A temporary digital identity can be a digital identity that expires after a set period of time. For example, a temporary digital identity can be sent to the mobile device of a user who is a visitor or guest at the facility. After the set period of time, the visitor/guest's temporary digital identity can expire, and the visitor/guest can lose access to the facility (or to particular areas of the facility). In some embodiments, the digital identity can be shared with a building management system. The building management system can allow management (e.g., monitoring and/or control) of the facility.

In some embodiments, a digital identity may expire after a particular period of time (e.g., one day). In some embodiments, a digital identity may expire based on a location of the mobile device. For example, a digital identity may expire when a user visiting the facility exits the facility. As the digital identity expires, so too can the access rights associated with it.

The information communicated to mobile devices described herein is not limited to a particular type of content and can include, for instance, text, images, multimedia files, hyperlinks, audio files, etc. In some embodiments, the initial display of information may be generalized such that a plurality of disparate messages can be displayed simultaneously. In some embodiments, further details associated with a message can be accessed by selection of that message. Accordingly, users can view relevant information at-a-glance and optionally drill down on certain portions of that information that may be of particular interest to them. In some embodiments, organizational information can be provided via an application executed by the mobile device. In some embodiments, organizational information can be provided via a hyperlink associated with an external web page corresponding to the organization. Selection of such a hyperlink, for instance, can cause the mobile device to display the relevant information based on the location of the mobile device, the time context and/or the group.

As previously discussed, causing changes of operations of mobile devices can include changing audio profiles. Stated differently, embodiments herein can cause a mobile device to change from a first audio profile to a second audio profile based on the location of the mobile device. In a general example, a mobile device can change from a "normal" or a "high volume" audio profile to a "silent" or "vibrate" audio profile when the user enters a particular area (e.g., a lecture hall) of a facility. In some embodiments, a change to the second audio profile may occur when the user enters the facility (e.g., at the beginning of a workday) and then the mobile device can revert to the first audio profile when the user exits the facility (e.g., at the end of a workday).

Changing audio profiles may occur or not occur based on time context. For example, a mobile device can change from the first audio profile to the second audio profile responsive to a determination that the mobile device is located in the particular area of the facility during a particular time period but not change from the first audio profile to the second audio profile responsive to a determination that the mobile device is located in the particular area of the facility outside of the particular time period. As an example, a cafeteria may be a noisy gathering place during lunch hours but may be used for independent study in the morning and evening. The importance of deactivating a mobile device's ringer in a particular area may vary based on the time context.

In some embodiments, a change from a first audio profile to a second audio profile may be made automatically (e.g., without user input). In some embodiments, a change from the first audio profile to the second audio profile may be made only following an input made using the interface of the mobile device. For example, if a user approaches or enters a lecture hall, a prompt can be issued notifying the user that silence is desired inside the lecture hall. In some embodiments, acknowledgement of the prompt via the selection of a display element can cause the change to the second audio profile.

Embodiments herein do not limit the first and second audio profiles to particular types and/or volumes of audio. Additionally, it is to be understood that embodiments herein are not limited to two audio profiles. In some embodiments, an audio profile can correspond to "full" notification volume settings. In some embodiments, an audio profile can correspond to "silent" notification volume settings. In some embodiments, an audio profile can correspond to a particular volume that is less than "full" and greater than "silent." For instance, an audio profile can correspond to 15 percent volume. In some embodiments, an audio profile can correspond to particular types (or particular subsets) of sounds. Further, different audio profiles can be associated with different areas of a facility. A first audio profile may be associated with a first area of a facility, a second audio profile may be associated with a second area of the facility, a third audio profile may be associated with a third area of the facility, etc.

In some embodiments, when the mobile device leaves the particular area, the mobile device can be changed from the second audio profile back to the first audio profile. In a manner analogous to that discussed above, some embodiments can include user approval and/or acknowledgement before reversion back to the first audio profile.

In some embodiments, causing changes of operations of mobile devices can include changing profiles other than audio profiles. For instance, some embodiments can include changing display profiles. Stated differently, embodiments herein can cause a mobile device to change from a first display profile to a second display profile based on the location of the mobile device. In a general example, a mobile device can change from a "normal" or a "bright" display profile to a "dim" or "reduced brightness" display profile when the user enters a particular area (e.g., a lecture hall) of a facility.

Some embodiments can include changing recording profiles (e.g., audio recording profiles). Stated differently, embodiments herein can cause a mobile device to change from a first recording profile to a second recording profile based on the location of the mobile device. In a general example, a mobile device can change from a "normal" or a "not recording" display profile to a "recording audio" or "recording video" profile when the user enters a particular area (e.g., a meeting room) of a facility.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon executable by a processor to:
    determine location information corresponding to a mobile device in a facility associated with an organization;
    determine a particular area of the facility in which the mobile device is located based on the location information;
    determine an organizational context while the device is in the particular area, wherein determining the organizational context includes determining a group of the organization to which a user of the mobile device belongs based on a digital identity issued to the mobile device by the organization, and wherein the group of the organization to which the user of the mobile device belongs is one of a plurality of groups of the organization; and
    cause a change of an operation of the mobile device based on the context, wherein causing the change of the operation of the mobile device includes causing information promulgated by the organization to be displayed in a particular level of detail selected based on the group of the organization to which the user of the mobile device belongs.

2. The medium of claim 1, wherein the instructions to determine the location information include instructions to determine the location information responsive to a communication being established between the mobile device and a beacon of the facility.

3. The medium of claim 2, wherein the beacon is BLUETOOTH® low energy beacon.

4. The medium of claim 1, wherein the instructions to determine the location information include instructions to determine the location information responsive to a communication between the mobile device an access reader of an access control system of the facility.

5. The medium of claim 1, wherein the instructions to determine the organizational context include instructions to determine a time associated with the determination of the particular area of the facility in which the mobile device is located.

6. The medium of claim 1, wherein the instructions to cause the change of the operation of the mobile device include instructions to cause a change in an audio profile of the mobile device.

7. The medium of claim 1, wherein the information corresponds to the particular area of the facility in which the mobile device is located.

8. The medium of claim 7, wherein the information additionally corresponds to a time associated with the determination of the particular area of the facility in which the mobile device is located.

9. A system for organizational context-based operations of a mobile device, comprising:
an access reader of an access control system of a facility controlled, at least in part, by an organization;
a wireless beacon installed in the facility;
a mobile device, configured to:
change from a first audio profile to a second audio profile responsive to a determination that the mobile device is located in a particular area of the facility based on a communication between the mobile device and at least one of: the access reader and the wireless beacon;
determine a group of the organization to which a user of the mobile device belongs based on a digital identity issued to the mobile device by the organization, wherein the group of the organization to which the user of the mobile device belongs is one of a plurality of groups of the organization; and
cause information promulgated by the organization and corresponding to the particular area of the facility to be displayed in a particular level of detail selected based on the group of the organization to which the user of the mobile device belongs.

10. The system of claim 9, wherein the mobile device is configured to change from the first audio profile to the second audio profile responsive to a determination that the mobile device has entered the facility.

11. The system of claim 9, wherein the mobile device is configured to change from the first audio profile to the second audio profile responsive to a determination that the mobile device is located in a particular room of the facility.

12. The system of claim 9, wherein the mobile device is configured to:
change from the first audio profile to the second audio profile responsive to a determination that the mobile device is located in the particular area of the facility during a particular time period; and
not change from the first audio profile to the second audio profile responsive to a determination that the mobile device is located in the particular area of the facility outside of the particular time period.

13. The system of claim 9, wherein the mobile device is configured to change from the first audio profile to the second audio profile responsive to:
the determination that the mobile device is located in the particular area of the facility; and
an input made using an interface of the mobile device.

14. A method for organizational context-based operations of a mobile device, comprising:
determining that a mobile device is located in a particular area of a facility controlled, at least in part, by an organization, based on a communication between the mobile device and at least one of: an access reader and a wireless beacon of the facility;
determining a group of the organization to which a user of the mobile device belongs based on a digital identity issued to the mobile device by the organization, wherein the group of the organization to which the user of the mobile device belongs is one of a plurality of groups of the organization;
determining a time context associated with the mobile device being in the particular area;
receiving information from the organization, the information determined based on the group and the time context; and
displaying the information via the mobile device, wherein the information is displayed in a particular level of detail selected based on the group of the organization to which the user of the mobile device belongs.

15. The method of claim 14, wherein the method includes displaying the information via an application executed by the mobile device.

16. The method of claim 14, wherein the information includes a hyperlink associated with an external webpage corresponding to the organization.

17. The method of claim 14, wherein the particular area is a conference room of the facility, and wherein the information includes instructions for establishing a conference call in the conference room.

18. The method of claim 14, wherein the method includes ceasing displaying the information via the mobile device responsive to a determination that the mobile device is no longer located in the particular area of the facility.

* * * * *